(12) United States Patent
Oohashi et al.

(10) Patent No.: US 7,329,973 B2
(45) Date of Patent: Feb. 12, 2008

(54) ROTARY ELECTRIC MACHINE

(75) Inventors: Masaaki Oohashi, Nagano (JP); Shigenori Miyairi, Nagano (JP); Ikuo Takeshita, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 11/464,634

(22) Filed: Aug. 15, 2006

(65) Prior Publication Data
US 2007/0040461 A1    Feb. 22, 2007

(30) Foreign Application Priority Data
Aug. 17, 2005    (JP)    ............................. 2005-236838

(51) Int. Cl.
*H02K 3/52* (2006.01)
*H02K 4/00* (2006.01)
(52) U.S. Cl. ......................................... 310/71; 310/215
(58) Field of Classification Search ................. 310/71, 310/215
See application file for complete search history.

(56) References Cited

U.S. PATENT DOCUMENTS

| | | | |
|---|---|---|---|
| 5,767,596 A * | 6/1998 | Stark et al. | 310/89 |
| 5,894,179 A * | 4/1999 | Filla et al. | 310/71 |
| 5,920,135 A * | 7/1999 | Ohshita | 310/71 |
| 6,429,557 B2 * | 8/2002 | Sheeran et al. | 310/71 |
| 6,528,913 B1 * | 3/2003 | Michaels | 310/71 |
| 6,724,109 B2 * | 4/2004 | Mimura | 310/71 |
| 6,841,904 B2 * | 1/2005 | Sano et al. | 310/71 |
| 2001/0006312 A1 * | 7/2001 | Sheeran et al. | 310/71 |
| 2001/0048262 A1 * | 12/2001 | Takano et al. | 310/179 |

(Continued)

FOREIGN PATENT DOCUMENTS

JP       11-275793       10/1999

(Continued)

*Primary Examiner*—Darren Schuberg
*Assistant Examiner*—Dustin Jacobs
(74) *Attorney, Agent, or Firm*—Rankin, Hill, Porter & Clark LLP

(57) ABSTRACT

The present invention provides a rotary electric machine, of which the occupied volume can be reduced and which allows a space in an electric apparatus equipped therewith to be utilized effectively. A slot insulator 15 is integrally formed with a holder mounting portion 25, a whole or major part of which is positioned on one of end faces of a yoke 11 of a stator core 7. A lead wire holder 27 includes a connection holding portion 27*a* for disposing a plurality of connections 30, in which lead-out wires of windings are connected with corresponding core wires 29*a* of lead wires 29, at a predetermined interval so that the connections do not contact with each other. The lead wire holder 27 is arranged so that the connection holding portion 27*a* is positioned over a part of the windings 9 and the holder mounting portion 25 when the lead wire holder is attached to the holder mounting portion 25. One end bracket, which faces to one of the end faces of the yoke, is formed with a recess which opens toward both sides in the axial direction thereof as well as opens outwardly in a radial direction of a shaft. The holder mounting portion 25 and lead wire holder 27 are received within the recess when the one end bracket is attached to the one end face of the yoke.

5 Claims, 8 Drawing Sheets

U.S. PATENT DOCUMENTS

| | | | |
|---|---|---|---|
| 2003/0071527 A1* | 4/2003 | Tetsuka et al. | 310/71 |
| 2004/0046464 A1* | 3/2004 | Sano et al. | 310/71 |
| 2004/0119350 A1* | 6/2004 | Miya et al. | 310/71 |
| 2004/0150275 A1* | 8/2004 | Koyama et al. | 310/71 |
| 2005/0218861 A1* | 10/2005 | Kimura et al. | 318/712 |
| 2005/0253466 A1* | 11/2005 | Seguchi et al. | 310/71 |

FOREIGN PATENT DOCUMENTS

| | | |
|---|---|---|
| JP | 2000-354347 | 12/2000 |
| JP | 2001-136703 | 5/2001 |
| JP | 2001-178062 | 6/2001 |
| JP | 2001-309600 | 11/2001 |
| JP | 2001-339894 | 12/2001 |
| JP | 2001339894 A * | 12/2001 |
| JP | 2002-359944 | 12/2002 |
| JP | 2002359944 A * | 12/2002 |
| JP | 2003-047189 | 2/2003 |
| JP | 2003-199279 | 7/2003 |
| JP | 2005261002 A * | 9/2005 |

* cited by examiner

ROTARY ELECTRIC MACHINE

FIELD OF THE INVENTION

The present invention relates to a rotary electric machine, particularly to a rotary electric machine in which a plurality of lead-out wires of windings are respectively connected to a plurality of lead wires for external connections.

BACKGROUND OF THE INVENTION

Japanese Patent Application Laid-open Publication No. 2002-359944 discloses a rotary electric machine, which comprises a stator core, windings of one or more phases wound on the stator core, a slot insulator made of an insulating resin and mounted on the stator core, and a lead wire holding structure for holding two or more lead wires for external connections to which two or more lead-out wires of the windings are respectively connected. In this rotary electric machine, the lead wire holding structure includes a lead wire holder made of a synthetic resin for holding the lead wires with end portions of the lead wires being arranged at a predetermined interval, and a holder mounting portion integrally formed with the slot insulator, to which the lead wire holder is attached. The holder mounting portion is formed to protrude from the stator core in a direction orthogonal to an axial direction of the shaft, and a recess is formed inside the holder mounting portion, into which the lead wire holder is fitted.

In the conventional rotary electric machine, the lead wire holder and the holder mounting portion are constructed to protrude from the stator core. Therefore, a volume occupied by the rotary electric machine is increased, and accordingly, a space in electric apparatus equipped with the rotary electric machine cannot be utilized effectively. Two or more lead-out wires of the windings may be connected directly to two or more lead wires for external connections, respectively. However, when such arrangement is adopted, means for insulating the respective connections is needed.

SUMMARY OF THE INVENTION

An object of the present invention is to provide a rotary electric machine, of which the occupied volume can be prevented from increasing and which allows for effective utilization of a space in an electric apparatus equipped with the rotary electric machine.

Another object of the present invention is to provide a rotary electric machine in which the insulation of respective connections between two or more lead-out wires of windings and two or more lead wires for external connections can be easily achieved.

A rotary electric machine, of which improvements the prevent invention aims at, comprises a stator core, windings of one or more phase, a slot insulator, a pair of end brackets, and a lead wire holding structure. The stator core includes a plurality of magnetic poles arranged at an interval in a circumferential direction in an inner circumferential portion of an annular yoke. The windings of one or more phases are wound on the plurality of magnetic poles of the stator core. The slot insulator is made of an insulating resin, and is mounted on the stator core for providing electrical insulation between the stator core and the windings. The pair of end brackets are each attached to either of end faces of the yoke for rotatably supporting a shaft of a rotor disposed inside the stator core. The end faces of the yoke are arranged apart in an axial direction of the shaft. The lead wire holding structure holds two or more lead wires for external connections, with respect to the slot insulator, to which two or more lead-out wires of the windings of one or more phases are respectively connected. The lead wire holding structure includes a lead wire holder made of a synthetic resin for holding the two or more lead wires in such a manner that one end of each of core wires of the lead wires is exposed and end portions of the two or more lead wires are disposed at a predetermined interval, and a holder mounting portion integrally formed with the slot insulator, onto which the lead wire holder is mounted. In the present invention, the holder mounting portion is arranged so that a whole or major part thereof may be located on one of the end faces of the yoke. The lead wire holder includes a connection holding portion in which a plurality of connections of the core wires of the two or more lead wires and the corresponding lead-out wires are disposed at a predetermined interval so as not to contact with each other. Moreover, the lead wire holder is constructed so that the connection holding portion may be located over a part of the windings and the holder mounting portion when the lead wire holder is mounted on the holder mounting portion. One of the end brackets opposing to the one end face of the yoke is formed with a recess opened toward both sides in the axial direction and opened outwardly in a radial direction of the shaft. The holder mounting portion and the lead wire holder are received within the recess when the one end bracket is attached to the one end face of the yoke. As with the present invention, when the holder mounting portion and the lead wire holder are received within the recess formed in one end bracket, the holder mounting portion and the lead wire holder can be arranged so as not to protrude from the stator core in a direction orthogonal to the axial direction of the shaft, or the protruding dimension thereof can be reduced. Accordingly, the volume occupied by the rotary electric machine can be reduced, and thus the space in electric apparatus, which is equipped with the rotary electric machine, can be utilized effectively.

In the present invention, a plurality of connections of the core wires of two or more lead wires and the corresponding lead-out wires are disposed at a predetermined interval so as not contact with each other in the connection holding portion of the lead wire holder. Therefore, means for insulating the respective connections is not required, and the insulation of the respective connections can be easily achieved.

The connection holding portion may, for example, comprise a plate-like body portion, one or more insulating wall half portions protruding from one face of the body portion and a plurality of lead wire sandwiching walls protruding from the other face of the body portion. The body portion may be formed with two or more core wire insertion through-holes penetrating the body portion in a thickness direction thereof. In this case, the two or more core wire insertion through-holes are arranged so that one end of each of the core wires of the two or more lead wires may be inserted into the through-hole from a side where the lead wire sandwiching walls are disposed. The plurality of lead wire sandwiching walls are disposed so that the two or more lead wires may respectively be sandwiched between two adjacent lead wire sandwiching walls, with one end of each of the core wires being inserted into the through-hole, and part of the lead wire that is located in a side, where the plurality of lead wire sandwiching walls are disposed, being bent and sandwiched. The one or more insulating wall half portions are disposed so that the half portions may be located between two adjacent connections where the lead-out wire is connected to one end of the corresponding core wire, with the connections being bent along the body portion. As described above, one end of each of the core wires of the two or more lead wires is respectively inserted into the core wire insertion through-hole from the side where the lead wire sandwiching wall is disposed, each of the lead wires is bent and sandwiched between two adjacent lead wire sandwiching walls of the plurality of lead wire sandwiching walls, and the connections are bent along the body portion so that the insulating wall half portions are positioned between two adjacent connections of the plurality of connections where the lead-out wire is connected to one end of the corresponding core wire. Thus, two or more lead wires can be held in the connection holding portion. Therefore, the two or more lead wires can be held in the connection holding portion in a simple manner, and the insulation of the plurality of connections can be achieved.

A bush formed of an insulating material is preferably fitted into the recess of the one end bracket to cover the connection holding portion of the lead wire holder. With this arrangement, the insulation between the plurality of connections and the outside of the rotary electric machine can be achieved. By shaping the bush in accordance with the outline shape of the one end bracket, an external face of the one end bracket can be formed flat.

One or more insulating wall half portions may be formed on an opposing face of the bush opposing to the connection holding portion and the half portions protrude toward the connection holding portion. The one or more insulating wall half portions of the connection holding portion are connected or joined with the one or more insulating wall half portions of the bush to form insulating walls for insulating the plurality of connections, with the bush being fitted into the recess of the one end bracket. As described above, the insulation of the plurality of connections can be reliably achieved only by fitting the bush into the recess of the one end bracket. Also, the contact portion between the connection holding portion of the lead wire holder and the bush can be reliably fitted or joined to each other.

The lead wire holder and the bush preferably have such shapes and dimensions that do not allow the holder and the bush to protrude out of the stator core in a direction orthogonal to the axial direction of the shaft. With this arrangement, since the lead wire holder and the bush do not protrude out of the stator core, a space in electric apparatus, which is equipped with the rotary electric machine, can be utilized more effectively.

According to the present invention, since the holder mounting portion and the lead wire holder are received within the recess formed in the one end bracket, the holder mounting portion and the lead wire holder can be prevented from protruding from the stator core in a direction orthogonal to the axial direction of the shaft, or the protruding dimension thereof can be reduced. Accordingly, the occupied volume of the rotary electric machine can be reduced and the space in electric apparatus equipped with the rotary electric machine can be utilized effectively.

DETAILED DESCRIPTION OF THE PREFERRED EMBODIMENT

Figure 1A:
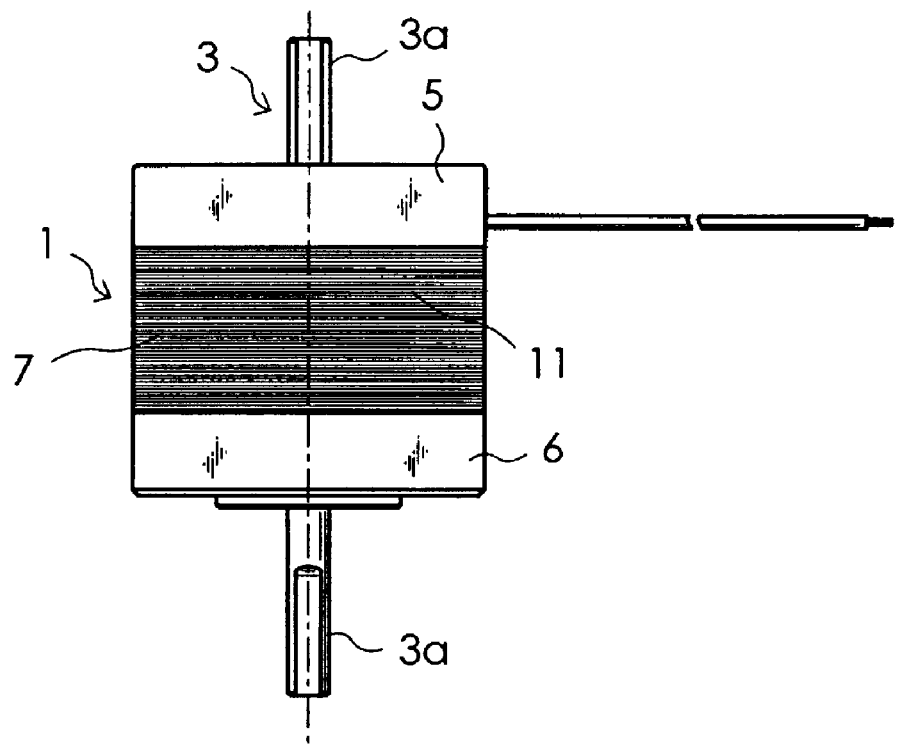
FIGS. 1A and 1B are respectively a front view and a plan view of a rotary electric machine according to an embodiment of the present invention.
Figure 1B:
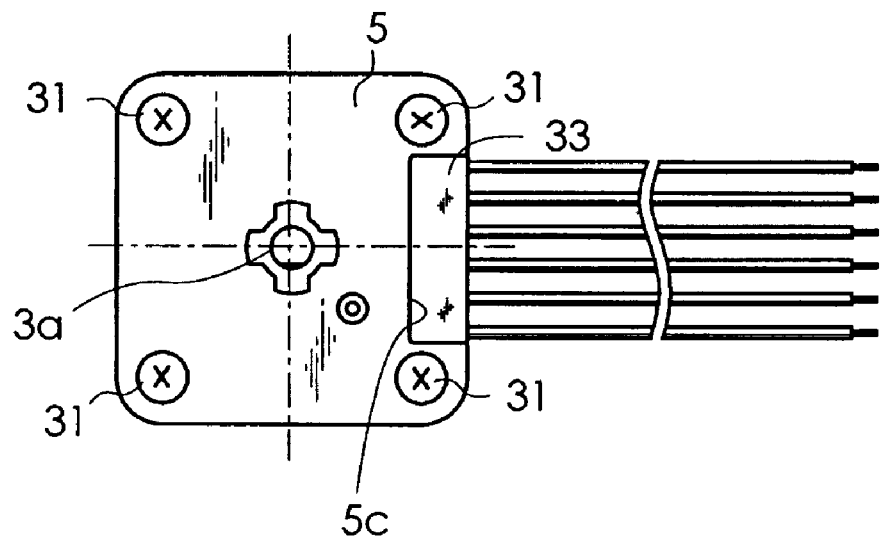
Figure 2A:
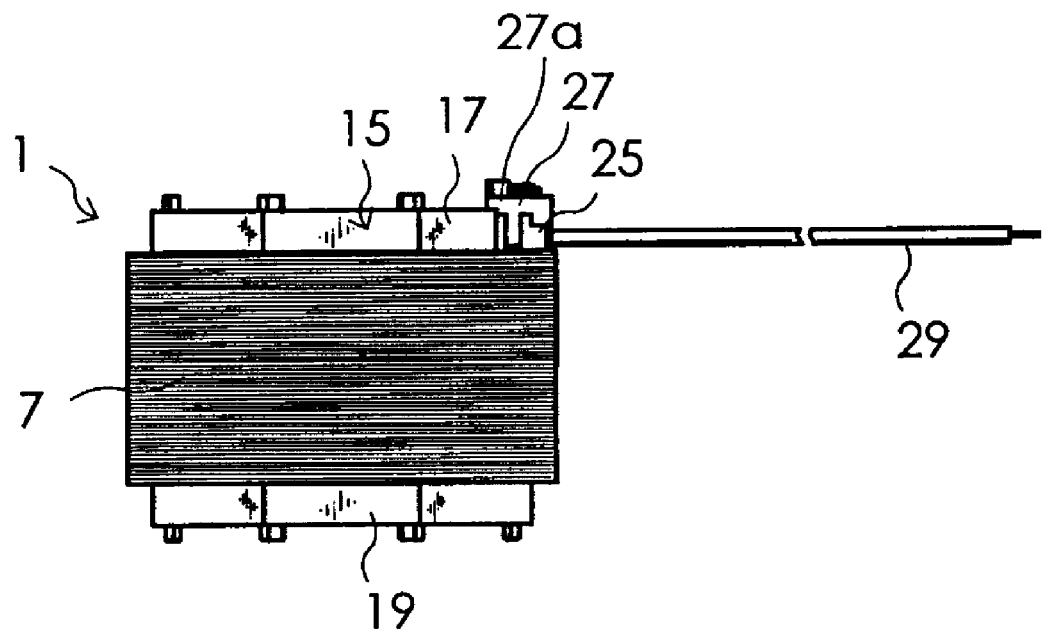
FIGS. 2A and 2B are respectively a front view and a plan view of a stator, to which lead wires are connected, of the rotary electric machine shown in FIGS. 1A and 1B.
Figure 2B:
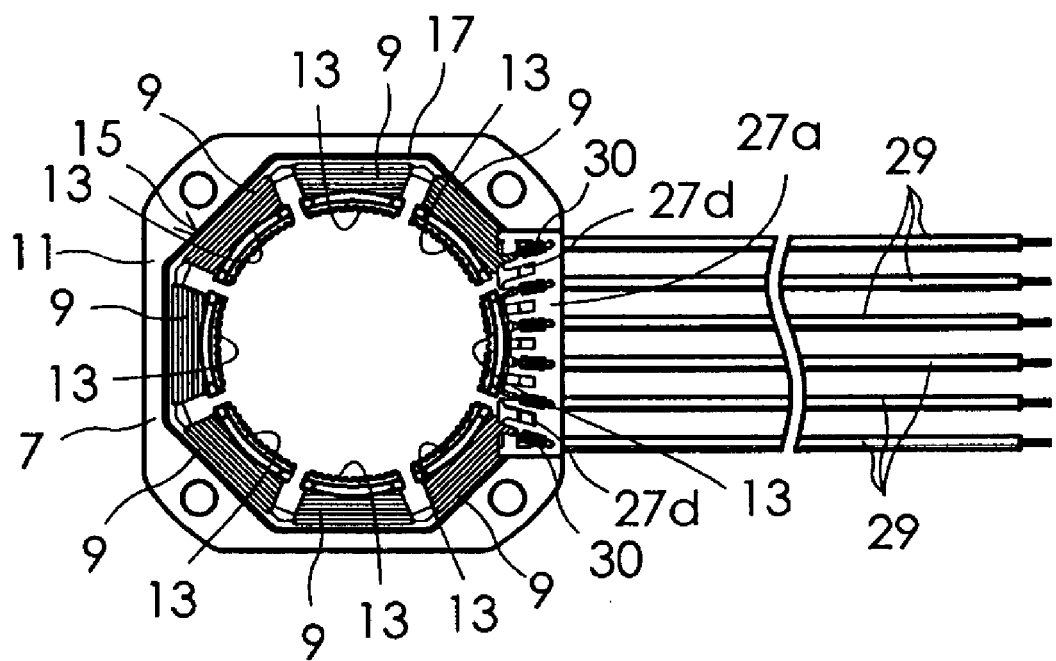

Hereinafter, an example of embodiment of the present invention will be described in detail with reference to the drawings. FIGS. 1A and 1B are respectively a front view and a plan view of a rotary electric machine according to an embodiment of the present invention. FIGS. 2A and 2B are respectively a front view and a plan view of a stator, t which lead wires are connected, of the rotary electric machine shown in FIGS. 1A and 1B. In short, FIGS. 2A and 2B respectively show the configuration in which a rotor 3 and a pair of end brackets 5, 6 are omitted from the rotary electric machine shown in FIGS. 1A and 1B. The rotary electric machine according to this embodiment comprises a stator 1, a rotor 3, a part of which is disposed inside the stator 1 and rotates therein, and a pair of end brackets 5 and 6 as shown in FIGS. 1A and 1B. The stator 1 includes a stator core 7 and eight windings 9 of one or more phases (in this embodiment, two phases) as shown in FIGS. 2A and 2B. The stator core 7 includes eight magnetic poles 13 arranged at a predetermined interval in a circumferential direction in an inner circumferential portion of an annular yoke 11. The stator core 7 is constructed of a plurality of steel plates, which have an identical shape and are overlaid in the axial direction of a shaft 3a of the rotor 3. The windings 9 are wound on each of the eight magnetic poles 13 of the stator core 7. A slot insulator 15 made of an insulating resin is mounted on the stator core 7 to provide electrical insulation between the stator core 7 and the windings 9. The slot insulator 15 is constructed of a pair of insulator divided members 17, 19, which are respectively arranged on either side in the axial direction and are fitted with the stator core 7.

Figure 3A:
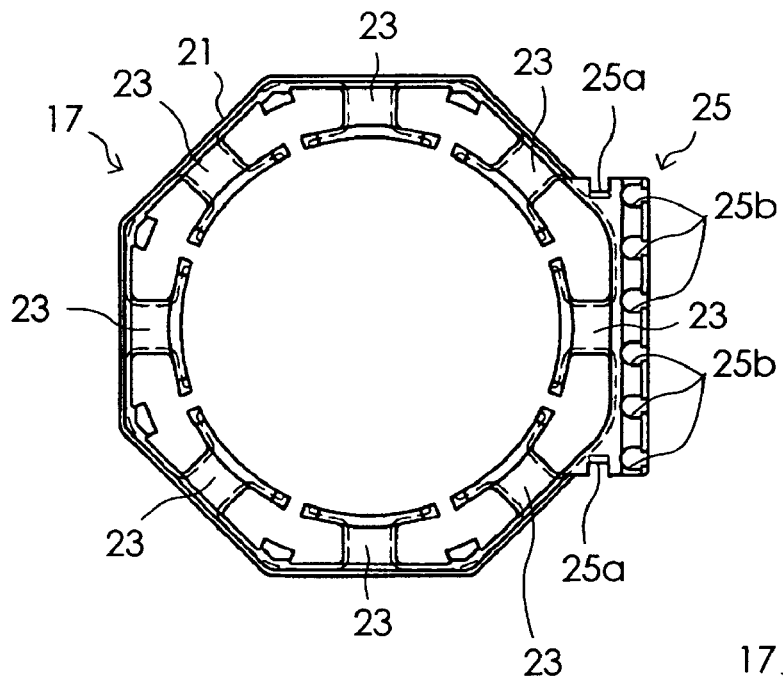
FIGS. 3A, 3B, and 3C are respectively a plan view, a rear view, and a partial front view of one of paired insulator divided members used in the rotary electric machine shown in FIG. 1.
Figure 3C:
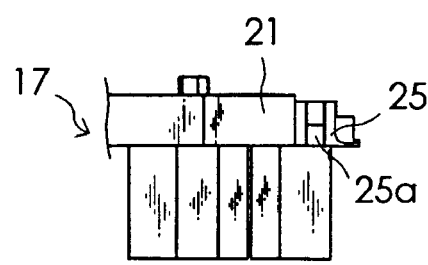
Figure 3B:
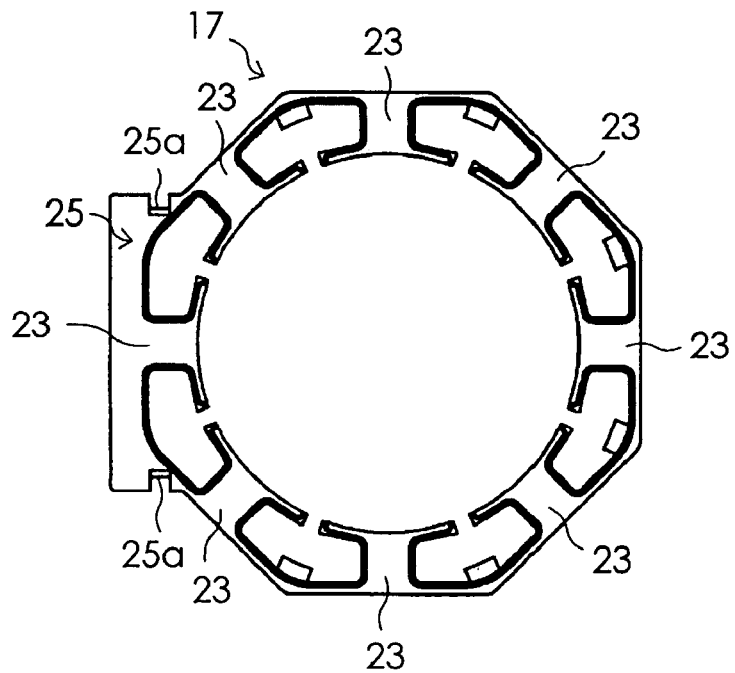

FIGS. 3A, 3B, and 3C are respectively a plan view, a rear view, and a partial front view of the insulator divided member 17, which is located at an upper position as shown in FIG. 2A, of the pair of the insulator divided members 17, 19. The insulator divided member 17 is made of a synthetic resin and integrally constructed of a base portion 21 covering an inner circumferential surface of the yoke 11, eight bobbin portions 23, which covers a part of the surfaces of the magnetic poles 13 excluding magnetic pole surfaces thereof, and a holder mounting portion 25 as shown in the respective figures.

The holder mounting portion 25 is constructed to protrude outwardly from a part of the base portion 21 so that substantially the entire part thereof is positioned on one of the end faces of the yoke 11 of the stator core 7. The holder mounting portion 25 is formed with a pair of engagement grooves 25a, which penetrate in a thickness direction and open at both ends in a longitudinal direction. The holder mounting portion 25 is also formed with six lead wire insertion holes 25b, which penetrate in the thickness direction and open in a direction orthogonal to the longitudinal direction. The holder mounting portion 25 is mounted with a lead wire holder 27 as will be described later.

The other insulator divided member 19, which is located at a lower position as shown in FIG. 2A, of the pair of insulator divided members 17, 19 has basically the same structure as that of the insulator divided member 17 except that the insulator divided member 19 does not have the holder mounting portion 25.

Figure 4A:
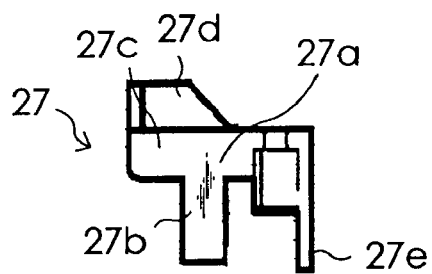
FIGS. 4A, 4B, and 4C are respectively a front view, a plan view, and a right side view of a lead wire holder used in the rotary electric machine shown in FIG. 1.
Figure 4B:
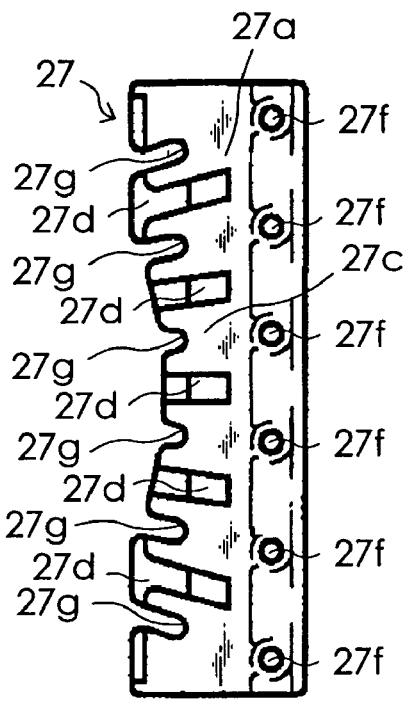
Figure 4C:
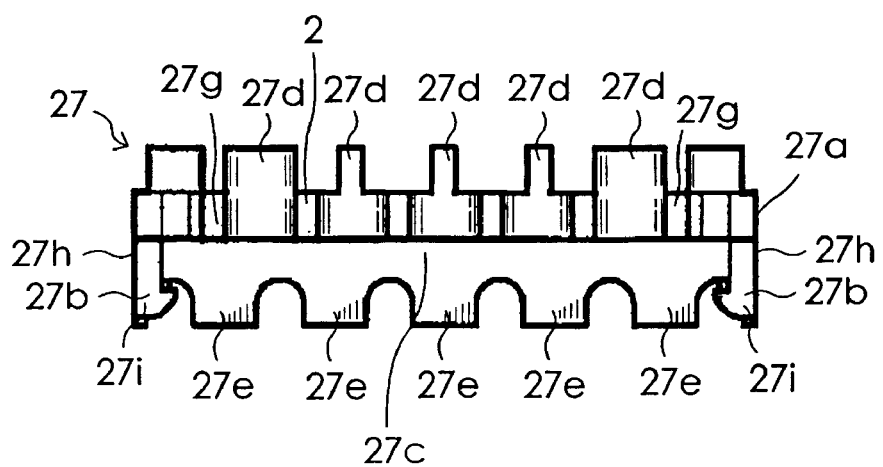
Figure 5A:
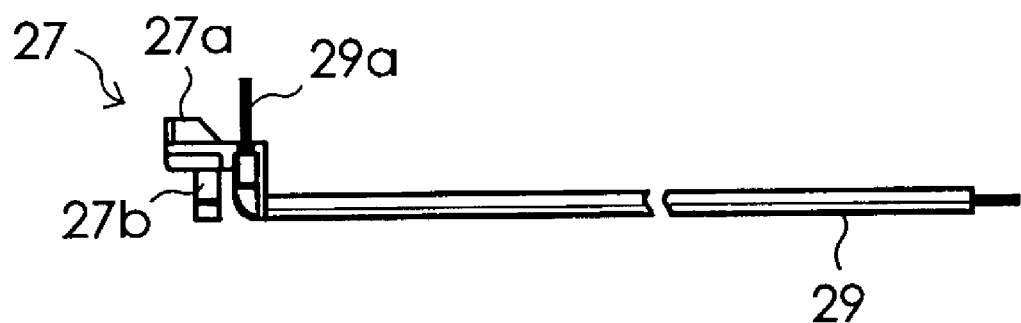
FIGS. 5A and 5B are respectively a front view and a plan view of the lead wire holder, which holds six lead wires for external connections and is not mounted onto the holder mounting portion, used in the rotary electric machine shown in FIG. 1.
Figure 5B:
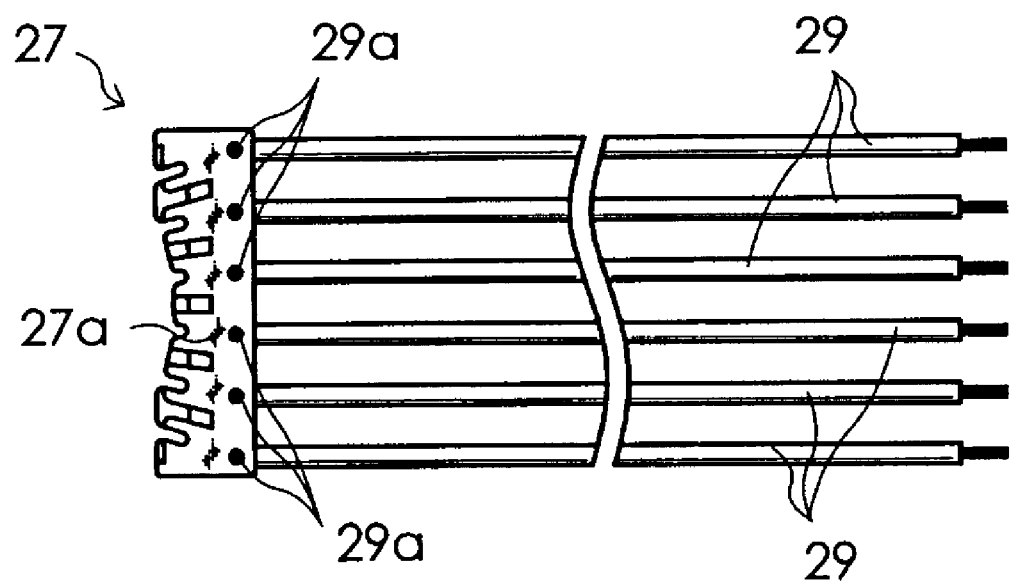

FIGS. 4A, 4B, and 4C are respectively a front view, a plan view, and a right side view of the lead wire holder 27, which is attached to the holder mounting portion 25. FIGS. 5A and 5B are respectively a front view and a plan view of the lead wire holder 27 holding six lead wires 29 for external connections that has not been mounted onto the holder mounting portion 25. The lead wire holder 27 is integrally constructed of a connection holding portion 27a and a pair of engagement sections 27b, and is formed of a synthetic resin, as shown in the respective figures. The connection holding portion 27a has a plate-like body portion 27c almost rectangular in shape, five insulating wall half portions 27d protruding from one of the faces of the body portion 27c, and five lead wire sandwiching walls 27e protruding from the other face of the body portion 27c. As shown in FIGS. 5A and 5B, the connection holding portion 27a holds lead wires 29 for external connections. Six core wire insertion through-holes 27f, which penetrate the body portion 27c in a thickness direction thereof, are arranged in one of edge portions of the body portion 27c in a direction orthogonal to the longitudinal direction thereof. Each of the core wire insertion through-holes 27f has a diameter slightly larger than that of the core wire 29a of the lead wire 29. Further, six recesses 27g, which penetrate the body portion 27c in the thickness direction and open in a direction orthogonal to the longitudinal direction, are formed in the other edge portion of the body portion 27c in a direction orthogonal to the longitudinal direction. The five insulating wall half portions 27d are formed between two adjacent recesses 27g among the six recesses 27g. The five lead wire sandwiching walls 27e are formed side by side in one of the edge portions of the body portion 27a. The pair of engagement portions 27b are formed at both ends of the body portion 27c protruding from one of the faces of the body portion 27c in the longitudinal direction. Each of the engagement portions 27b has a hook-like shape including an extended portion 27h, which extends in a direction orthogonal to the longitudinal direction of the body portion 27c, and a projecting portion 27i, which is formed at an end portion of the extended portion 27h to protrude in a direction that the pair of engagement sections 27b are opposing to each other. The lead wire holder 27, which holds the lead wires 29 for external connections, is attached to the holder mounting portion 25 when the pair of engagement sections 27b are snapped or fitted into the pair of engagement grooves 25a of the holder mounting portion 25. These holder mounting portion 25 and the lead wire holder 27 are received within a recess 5c of an end bracket 5, which will be described later, when the end bracket 5 is attached to the one of end faces of the yoke 11.

Figure 6:
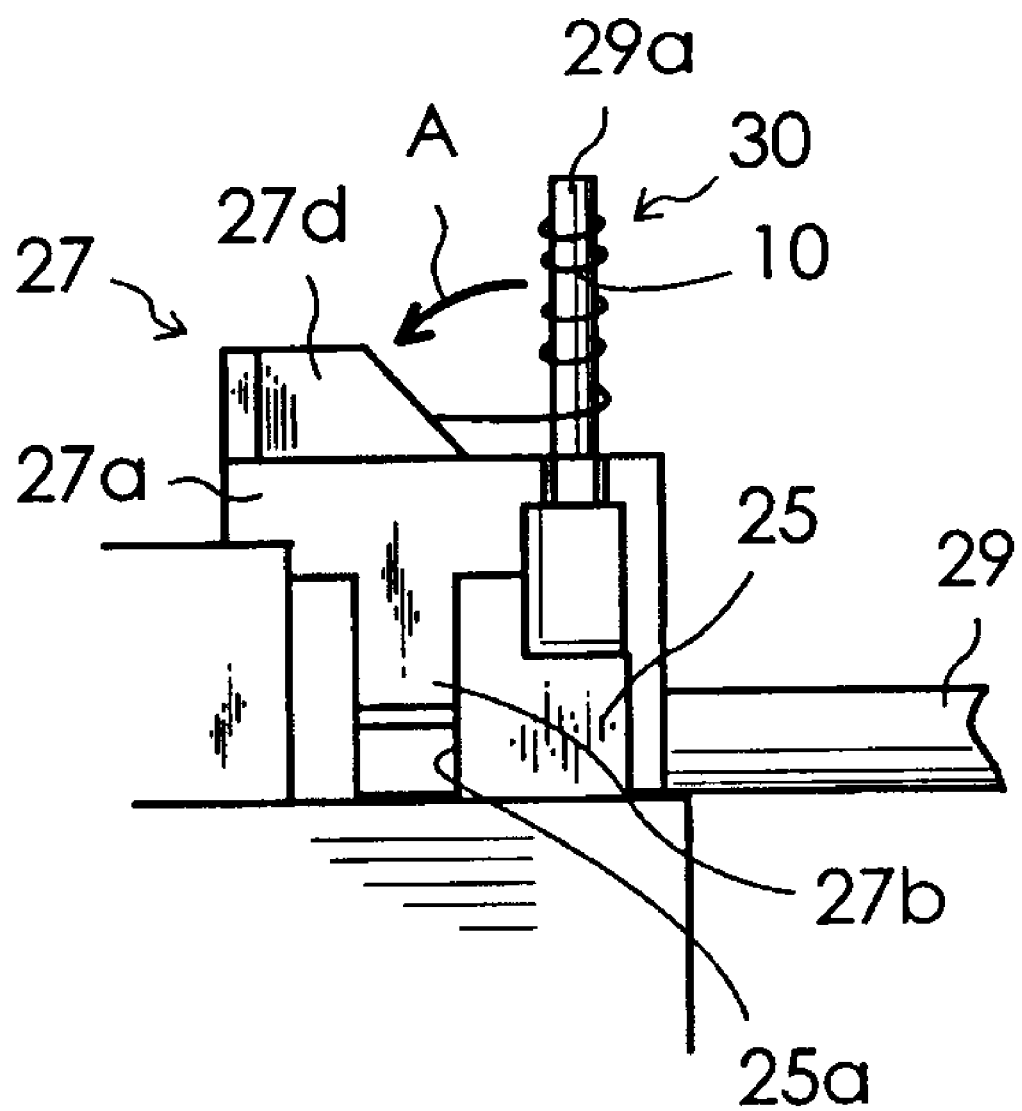
FIG. 6 is an illustration used to describe how to connect a lead-out wire of the winding to the lead wire for external connection in the rotary electric machine shown in FIG. 1.

When the lead wire holder 27 is attached to the holder mounting portion 25 as shown in FIGS. 2A and 2B, lead-out wires 10 of the windings 9 are connected to the lead wires 29 for external connections (refer to FIG. 6). In this embodiment of the present invention, the lead wire holding structure includes the lead wire holder 27 and the holder mounting portion 25.

In this embodiment, the lead-out wires 10 of the windings 9 are connected to the lead wires 29 for external connections as described below. First of all, one end of the coating of the six lead wires 29 is peeled off to expose one end of each of the core wires 29a. Then, the core wires 29a of the six lead wires 29 are respectively inserted through the six core wire insertion through-holes 27f in the lead wire holder 27 from the side where the lead wire sandwiching walls 27e are disposed. Then, the six lead wires 29 are bent and sandwiched respectively between two adjacent lead wire sandwiching walls 27e among the five lead wire sandwiching walls 27e. Thus, the six lead wires 29 for external connections are held by the lead wire holder 27 as shown in FIGS. 5A and 5B. Then, the pair of engagement portions 27b are snapped or fitted into the pair of engagement grooves 25a of the holder mounting portion 25 to attach the lead wire holder 27 to the holder mounting portion 25 as shown in FIG. 6. Thus, parts of the six lead wires 29 are disposed in the six lead wire insertion holes 25b in the holder mounting portion 25 shown in FIG. 3A. Then, the lead-out wires 10 of the windings 9 are wound on the core wires 29a of the six lead wires 29, and the lead-out wires 10 are soldered to the core wires 29a. In this embodiment, eight lead-out wires 10 are provided corresponding to the number of the windings 9. Two lead-out wires 10 are wound respectively on two core wires 29a located at both ends among the six core wires 29a of the lead wires 29, and one lead-out wire 10 is wound on each of the rest four core wires 29a of the lead wires 29 and soldered therewith. In this embodiment, connections 30 are constructed of the parts of the core wires 29a connected with the lead-out wires 10. Then, the connections 30 are bent toward the windings 9 (in the direction indicated with arrow "A" in FIG. 6) along the body portion 27a so that insulating wall half portions 27d are located between two adjacent connections of the six connections 30. Thus, connection of the lead-out wires 10 of the windings 9 with the six lead wires 29 for external connections is completed as shown in FIGS. 2A and 2B.

Figure 7A:
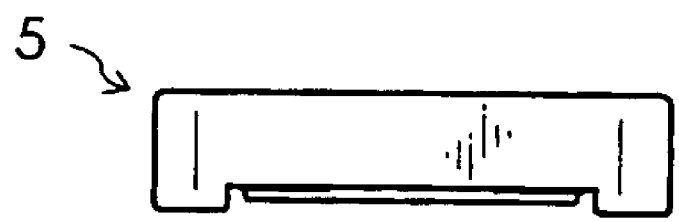
FIGS. 7A and 7B are respectively a front view and a plan view of one of paired end brackets used in the rotary electric machine shown in FIG. 1.
Figure 7B:
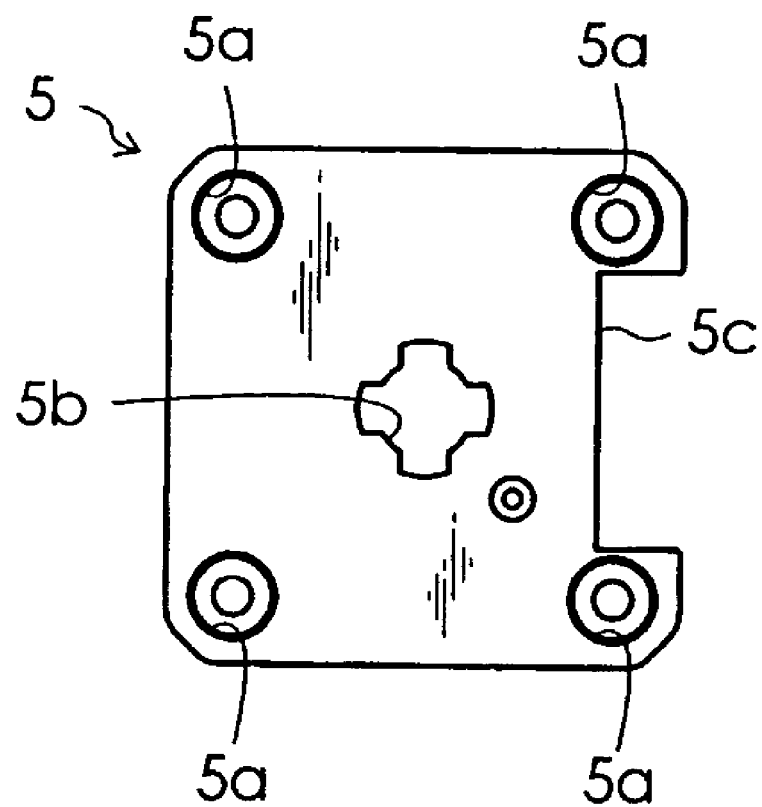

The pair of end brackets 5, 6 are formed of aluminum die-cast respectively, and are respectively attached to either of end faces of the yoke 11 in both sides in the axial direction of the shaft 3a in order to rotatably support the shaft 3a of the rotor 3 disposed inside the stator core 7, as shown in FIG. 1A. FIGS. 7A and 7B are respectively a front view and a plan view of one end bracket 5 of the pair of end brackets 5 and 6, which is positioned at the upper position as shown in FIG. 1A. The end bracket 5 is almost rectangular in shape and has four through-holes for screws 5a and a through-hole for the shaft 5b, penetrating therethrough in a thickness direction thereof. The four through-holes for screws 5a are formed at four corners of the end bracket 5. The end bracket 5 is attached to the yoke 11 of the stator core 7 with screws 31 passing through the through-holes for screws 5a (refer to FIG. 1B). A bearing (not shown) is disposed around an inner wall of the shaft through-hole 5b. Owing to the bearing, the shaft 3a is rotatably supported by the end bracket 5. The end bracket 5 is formed with the recess 5c, which opens toward both sides in axial direction of the shaft 3a and opens outwardly in a radial direction of the shaft 3a. The recess 5c is shaped and sized to receive the holder mounting portion 25 and lead wire holder 27 therein when the end bracket 5 is attached to the one end face of the yoke 11. Also, a bush 33 is fitted into the recess 5c to cover the connection holding portion 27c of the lead wire holder 27 as shown in FIG. 1B.

Figure 8A:
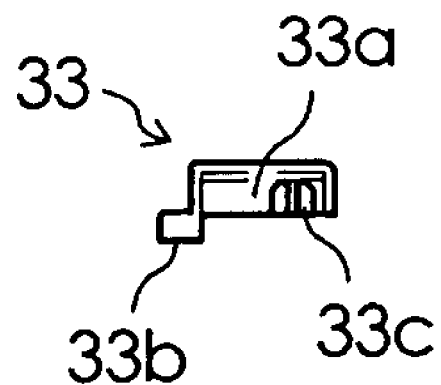
FIGS. 8A and 8B are respectively a front view and a plan view of a bush used in the rotary electric machine shown in FIG. 1
Figure 8B:
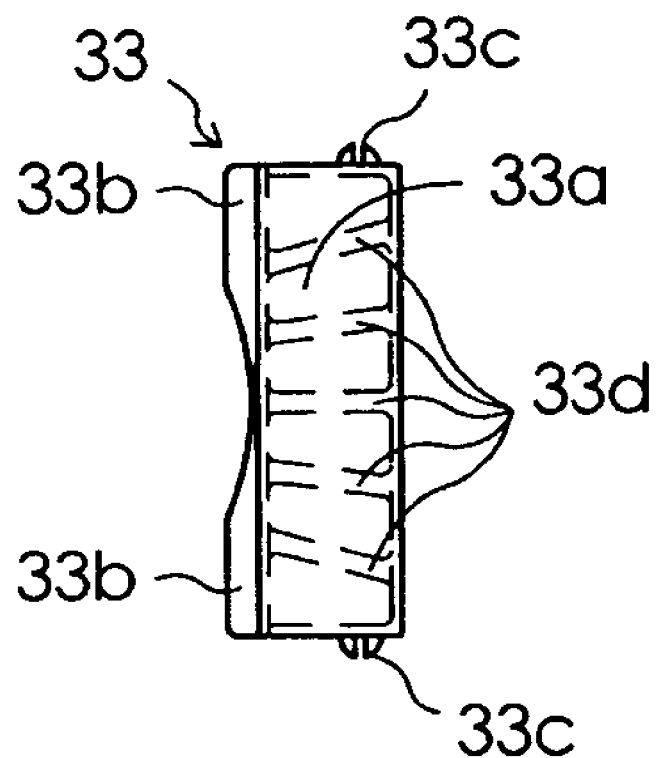

FIGS. 8A and 8B are respectively a front view and a plan view of the bush 33. The bush 33 is formed of a synthetic resin and comprises a bush body portion 33a, two engagement ribs 33b and two engagement projections 33c. When the bush 33 is fitted into the recess 5c of the end bracket 5, two engagement ribs 33b and two engagement projections 33c are fitted into depressed portions between the end bracket 5 and the stator 1, and thus the bush 33 is prevented from being pulled off from the end bracket 5. The bush body portion 33a has substantially the same shape and dimensions as those of the recess 5c. Five insulating wall half portions 33d, which protrude toward the connection holding portion 27a, are formed on a surface of the body portion 33a, opposing to the connection holding portion 27a of the lead wire holder 27. When the bush 33 is fitted into the recess 5c of the one end bracket 5, the five insulating wall half portions 33d are connected and joined with the five insulating wall half portions 27d of the connection holding portion 27a to form insulating walls which attain insulation among six connections 30. The above-described lead wire holder 27 and the bush 33 have such shapes and dimensions that do not allow the holder and the bush to protrude out of the stator core 7 in a direction orthogonal to the axial direction of the shaft 3a.

The other end bracket 6 of the pair of end brackets 5 and 6, which is located at the lower portion as shown in FIG. 1A, has basically the same structure as that of the one end bracket 5 except that the end bracket 6 does not have a recess 5c.

According to the rotary electric machine of this embodiment, the holder mounting portion 25 and the lead wire holder 27 are received within the recess 5c of the one end bracket 5, and the lead wire holder 27 and the bush 33 have such shapes and dimensions that do not allow the holder and the bush to protrude out of the stator core 7 in a direction orthogonal to the axial direction of the shaft 3a. Accordingly, the volume occupied by the rotary electric machine can be reduced, and thus the space in electric apparatus, which is equipped with the rotary electric machine, can be utilized effectively.

Further, the present invention is not limited to this embodiment, but various variations and modifications may be made without departing from the scope of the present invention.

What is claimed is:

1. A rotary electric machine, comprising:
    a stator core including a plurality of magnetic poles arranged at an interval in a circumferential direction in an inner circumferential portion of an annular yoke;
    windings of one or more phases wound on the plurality of magnetic poles of the stator core;
    a slot insulator made of an insulating resin, mounted on the stator core for providing electrical insulation between the stator core and the windings;
    a pair of end brackets, each attached to either of end faces of the yoke for rotatably supporting a shaft of a rotor disposed inside the stator core, the end faces of the yoke being arranged apart in an axial direction of the shaft; and
    a lead wire holding structure for holding two or more lead wires for external connections, with respect to the slot insulator, to which two or more lead-out wires of the windings of one or more phases are respectively connected;
    the lead wire holding structure including a lead wire holder made of a synthetic resin for holding the two or more lead wires in such a manner that one end of each of core wires of the lead wires is exposed and end portions of the two or more lead wires are disposed at a predetermined interval, and a holder mounting portion integrally formed with the slot insulator, onto which the lead wire holder is mounted,
    the holder mounting portion being arranged so that a whole or major part thereof may be located on one of the end faces of the yoke,
    the lead wire holder including a connection holding portion in which a plurality of connections of the core wires of the two or more lead wires and the corresponding lead-out wires are disposed at a predetermined interval so as not to contact with each other,
    the lead wire holder being constructed so that the connection holding portion may be located over a part of the windings and the holder mounting portion when the lead wire holder is mounted on the holder mounting portion,
    one of the end brackets opposing to the one end face of the yoke being formed with a recess opened toward both sides in the axial direction and opened outwardly in a radial direction of the shaft,
    the holder mounting portion and the lead wire holder being received within the recess when the one end bracket is attached to the one end face of the yoke.

2. The rotary electric machine according to claim 1, wherein the connection holding portion comprises a plate-like body portion, one or more insulating wall half portions protruding from one face of the body portion and a plurality of lead wire sandwiching walls protruding from the other face of the body portion;
    wherein the body portion is formed with two or more core wire insertion through-holes penetrating the body portion in a thickness direction thereof;
    wherein the two or more core wire insertion through-holes are arranged so that one end of each of the core wires of the two or more lead wires may be inserted into the through-hole from a side where the lead wire sandwiching walls are disposed;
    wherein the plurality of lead wire sandwiching walls are disposed so that the two or more lead wires may respectively be sandwiched between two adjacent lead wire sandwiching walls, with one end of each of the core wires being inserted into the through-hole, and part of the lead wire that is located in a side, where the plurality of lead wire sandwiching walls are disposed, being bent and sandwiched;
    wherein the one or more insulating wall half portions are disposed so that the half portions may be located between two adjacent connections where the lead-out wire is connected to one end of the corresponding core wire, with the connections being bent along the body portion.

3. The rotary electric machine according to claim 1, wherein a bush formed of an insulating material is fitted into the recess to cover the connection holding portion of the lead wire holder.

4. The rotary electric machine according to claim 3, wherein one or more insulating wall half portions are formed on an opposing face of the bush opposing to the connection holding portion, the half portions protruding toward the connection holding portion;

wherein the one or more insulating wall half portions of the connection holding portion are connected or joined with the one or more insulating wall half portions of the bush to form insulating walls for insulating the plurality of connections, with the bush being fitted into the recess of the one end bracket.

5. The rotary electric machine according to claim 1, wherein the lead wire holder and a bush have such shapes and dimensions that do not allow the holder and the bush to protrude out of the stator core in a direction orthogonal to the axial direction of the shaft.

\* \* \* \* \*